US006292126B1

(12) United States Patent
Chelehmal et al.

(10) Patent No.: US 6,292,126 B1
(45) Date of Patent: *Sep. 18, 2001

(54) QUANTIZER THAT USES OPTIMUM DECISION THRESHOLDS

(75) Inventors: Majid Chelehmal, Broomfield; Rich S. Prodan, Boulder, both of CO (US)

(73) Assignee: Cable Television Laboratories, Louisville, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 16 days.

(21) Appl. No.: 09/061,510

(22) Filed: Apr. 16, 1998

Related U.S. Application Data

(60) Provisional application No. 60/070,065, filed on Dec. 30, 1997.

(51) Int. Cl.[7] .................................................. H03M 1/12
(52) U.S. Cl. .................................. 341/155; 341/126
(58) Field of Search ................................. 341/155, 126

(56) References Cited

U.S. PATENT DOCUMENTS

| | | | |
|---|---|---|---|
| 3,931,596 | * | 1/1976 | Gersho et al. ........................ 332/11 |
| 4,381,428 | * | 4/1983 | Kolesar et al. ...................... 179/15.5 |
| 4,386,366 | * | 5/1983 | Mori ..................................... 358/135 |
| 4,470,146 | * | 9/1984 | Yatsuzuka et al. .................... 375/30 |
| 5,295,155 | | 3/1994 | Gersbach et al. ........................ 375/4 |
| 5,337,373 | * | 8/1994 | Marandici et al. .................... 382/51 |

FOREIGN PATENT DOCUMENTS

WO 88/10544    6/1998    (WO) ............................. H04N/7/137

OTHER PUBLICATIONS

"Digital Coding of Waveforms, Principles and Applications to Speech and Video", by N.S. Jayant—Peter Noll, Prentice–Hall, Inc., pp. 129–135.

1991 Intl. Symposium On Ckts. And Sys., vol. 1/5,Signal Image and Video Process., Jun. 11–14 1991, pp. 340–343, "On The Qauntization Error of Max Quantizer", Teiji Ohata.

* cited by examiner

*Primary Examiner*—Brian Young
(74) *Attorney, Agent, or Firm*—William W. Cochran; Cochran & Collins LLP

(57) ABSTRACT

Disclosed is a quantizer that uses optimum decision thresholds that are determined by the average of the optimum reconstruction levels of a detected signal in the presence of noise. The Lloyd-Max Quantizer is used to determine the optimum reconstruction levels $y_K$ using a minimum means squared error technique. Decision thresholds $x_K$ are therefore established at levels where influences of noise or other distortions are equally likely to occur between adjacent transmitted points. The present invention can be utilized in quadrature amplitude modulation (QAM) systems or any quantizer design that quantizes an analog signal.

10 Claims, 11 Drawing Sheets

QUANTIZER THAT USES OPTIMUM DECISION THRESHOLDS

REFERENCE TO RELATED APPLICATIONS

This Application is based upon Provisional Application No. 60/070,065 filed Dec. 30, 1997, entitled "Quantizer That Uses Optimum Decision Thresholds".

BACKGROUND OF THE INVENTION

A. Field of Invention

The present invention generally pertains to analog to digital converters, and more particularly pertains to quantizers.

B. Description of the Background

Communications systems frequently use high frequency carrier signals that are modulated by information for transmission from a transmitter to a receiver. On the receiver end, the modulated signal is demodulated to retrieve the information that has been transmitted over the transmission medium. The transmission medium may, for example, constitute free space, electrical wires such as coaxial cables and telephone wires, fiber optics, acoustical transmission media, etc. Various types of waves can be used to transmit these modulated signals, including electromagnetic waves, magnetic waves, acoustical waves, etc.

Significant noise interference may occur as a result of the transmission medium. For example, atmospheric interference may cause noise of various types in the transmission of electromagnetic waves over free space. In wire transmission systems, such as coaxial cable or twisted pair networks, active components may cause nonlinear effects that can result in significant noise and/or distortion of the transmitted signal. Additionally, in transmitting signals such as quadrature amplitude modulation signals (QAM), a slight error in the phase of the carriers at the demodulator will not only result in the possible loss of the signal, but may also lead to interference between the two channels. Similar difficulties arise when the local frequency is in error. In addition, unequal attenuation of the upper and lower sidebands during transmission also leads to cross-talk or co-channel interference. Other types of noise can also occur, such as attenuation distortion, envelope delay distortion, incidental phase disturbances, including phase jitter, phase wobble, and phase hits that cause the transmitted signal to experience acceleration, slowdown, or even sudden discontinuities. Other sources of noise and distortion may include impulse noise and background noise, thermal noise, harmonic distortion and intermodulation distortion.

The information that is transmitted by modulating a carrier may comprise digital signals, including multilevel digital signals. Difficulties frequently arise in the ability to correctly quantize an analog signal to retrieve the correct digital signal at the receiver. In order to correctly quantize a multilevel signal, decision thresholds must be established to distinguish between different levels of the digital signal.

A typical approach for establishing the appropriate level of a decision threshold in a multilevel signal is to set the decision threshold at a midway point between the levels of the transmitted signal level. This is based on the assumption that noise and other distortion will equally affect the signal regardless of the amplitude or phase of the signal. Assuming that the received signals are equally as likely to be affected by the noise or distortion, on average the smallest possible error will occur by placing the threshold halfway between the two levels of the transmitted signal.

However, when nonlinear distortions occur and nonlinear noise affects the received signal, the optimum level for setting the decision threshold does not fall halfway between the levels of the transmitted signal. For example, amplitude-dependent noise will cause a signal at a higher level to cross over the decision threshold that is placed halfway between two levels more often than a lower amplitude signal, which will not have as many excursions across the decision threshold. In other words, since the larger amplitude signal will be more greatly affected by noise, the larger amplitude signal will have more frequent occurrences when it crosses over the threshold than a lower amplitude signal because the noise is more severe at a higher amplitude state.

It is therefore desirable to provide quantizer which adaptively places the decision threshold at a level that minimizes the overall error rate.

SUMMARY OF THE INVENTION

The present invention overcomes the disadvantages and limitations of the prior art by providing a quantizer that adaptively determines an optimum decision threshold by locating a decision threshold level such that it is equally likely that a disturbance will cause a wrong decision. The present invention provides a way of adaptively determining the location of the decision threshold to minimize the overall error rate by determining observed signal strengths in a system.

The present invention may therefore comprise a method of quantizing an analog signal using an optimum decision threshold comprising the steps of, slicing the analog signal into a series of discrete signals having indices that are representative of the amplitude of the analog signal, generating histograms from the indices indicative of the number of discrete signals for each of the indices, generating optimum reconstruction levels by using the histograms to determine minimum means squared errors, and generating the optimum decision thresholds by using the optimum reconstruction levels to determine the average of the optimum reconstruction levels.

The present invention may further comprise a quantizer that adaptively determines a value of an optimum decision threshold for quantizing an analog signal to minimize the overall quantizing error rate by observing signal strengths of the analog signal comprising, a histrogram generator that generates histograms that indicate the signal strengths of the analog signal, an optimum reconstruction level generator that uses the histograms to generate optimum reconstruction levels by determining minimum means squared errors, and an optimum decision threshold generator that uses the optimum reconstruction levels to generate optimum decision thresholds by determining the average of the optimum reconstruction levels.

The present invention therefore is designed to obtain the same error rate for different level signals independently of whether noise or other distortions nonproportionately affect the different levels. Additionally, the present invention provides symmetric decision thresholds if the noise is linear, and nonsymmetric decision thresholds when the noise is nonlinear. The use of the present invention therefore does not degrade the performance of the quantizer when nonlinear effects are not present. Hence, there are no tradeoffs in using the present invention. Also, significant decreases in the error rate can be achieved using the present invention. The nonlinear nature of noise and other distortions that can affect a transmitted signal can significantly affect the error rate of a quantized signal. An adaptive modification of the location of the decision threshold can provide significant decreases in the error rate. For example, a small percentage change in the level of the decision threshold may reduce the error rate by several hundred percent. Accordingly, the present invention can provide a substantial benefit in that it provides the ability to correctly quantize an analog signal with a high degree of accuracy.

DETAILED DESCRIPTION OF THE INVENTION

Figure 1:
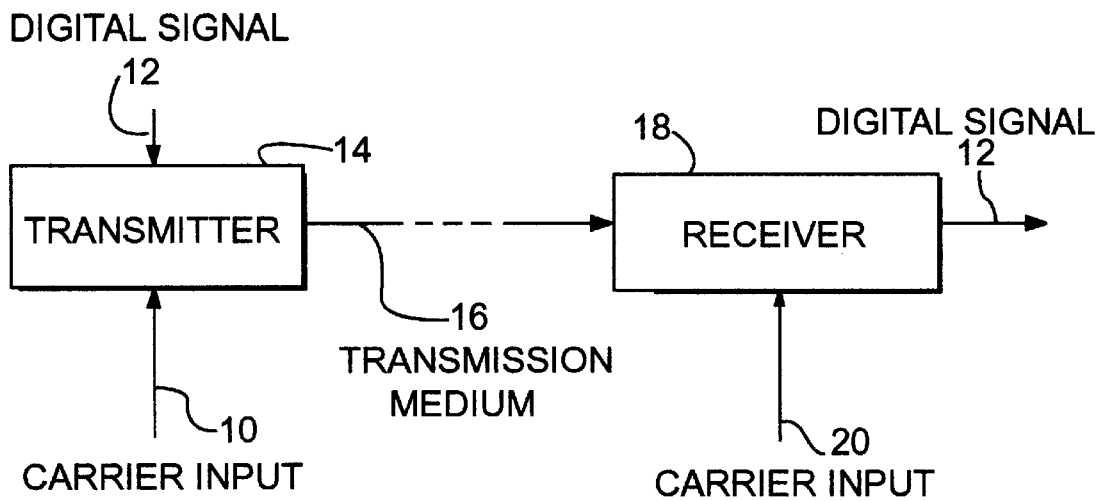
FIG. 1 is a schematic block diagram illustrating a transmission system in which the present invention can be utilized.

FIG. 1 discloses a typical transmission system in which the present invention can be utilized. In accordance with the transmission system of FIG. 1, a carrier input signal 10 is applied to a transmitter, together with a digital signal 12 that is used by the transmitter 14 to modulate the carrier input 10. The transmitted signal is then applied to the transmission medium 16 which can comprise a wire transmission medium, the free space transmission of electromagnetic waves, or other transmission medium. The transmission signal is received by a receiver 18 that utilizes a carrier input 20 to demodulate and retrieve the digital signal 12 from the output of the receiver 18. The present invention is embodied in a quantizer that is disposed within the receiver 18 that is used to retrieve the digital signal 12.

Figure 2:
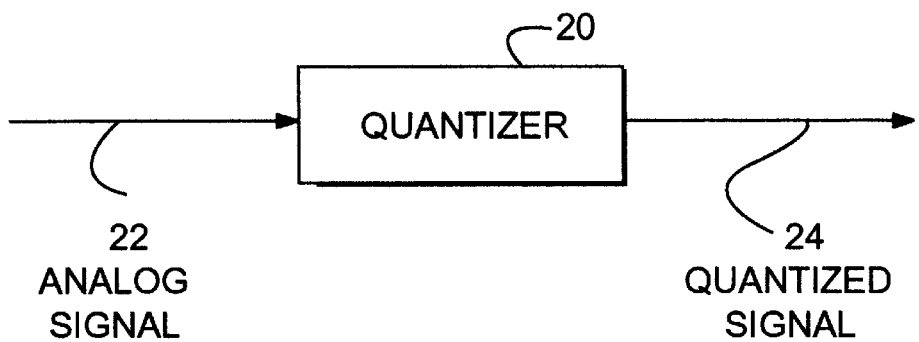
FIG. 2 is a more generalized block diagram of the manner in which the present invention can be utilized.

FIG. 2 is a simple schematic block diagram of a quantizer 20 that operates in accordance with the present invention. The quantizer 20 receives an analog signal 22 and generates an output quantized signal 24 utilizing a decision threshold or multiple decision thresholds, depending upon the number of levels of the quantized signal 24. Typical quantizers 20 utilize preset decision thresholds. The present invention uses adaptive decision thresholds that are generated by analyzing the signals that are actually being received in the presence of noise. The present invention minimizes the overall error rate by observing and analyzing signal strengths and phases of the received signal.

Figure 3:
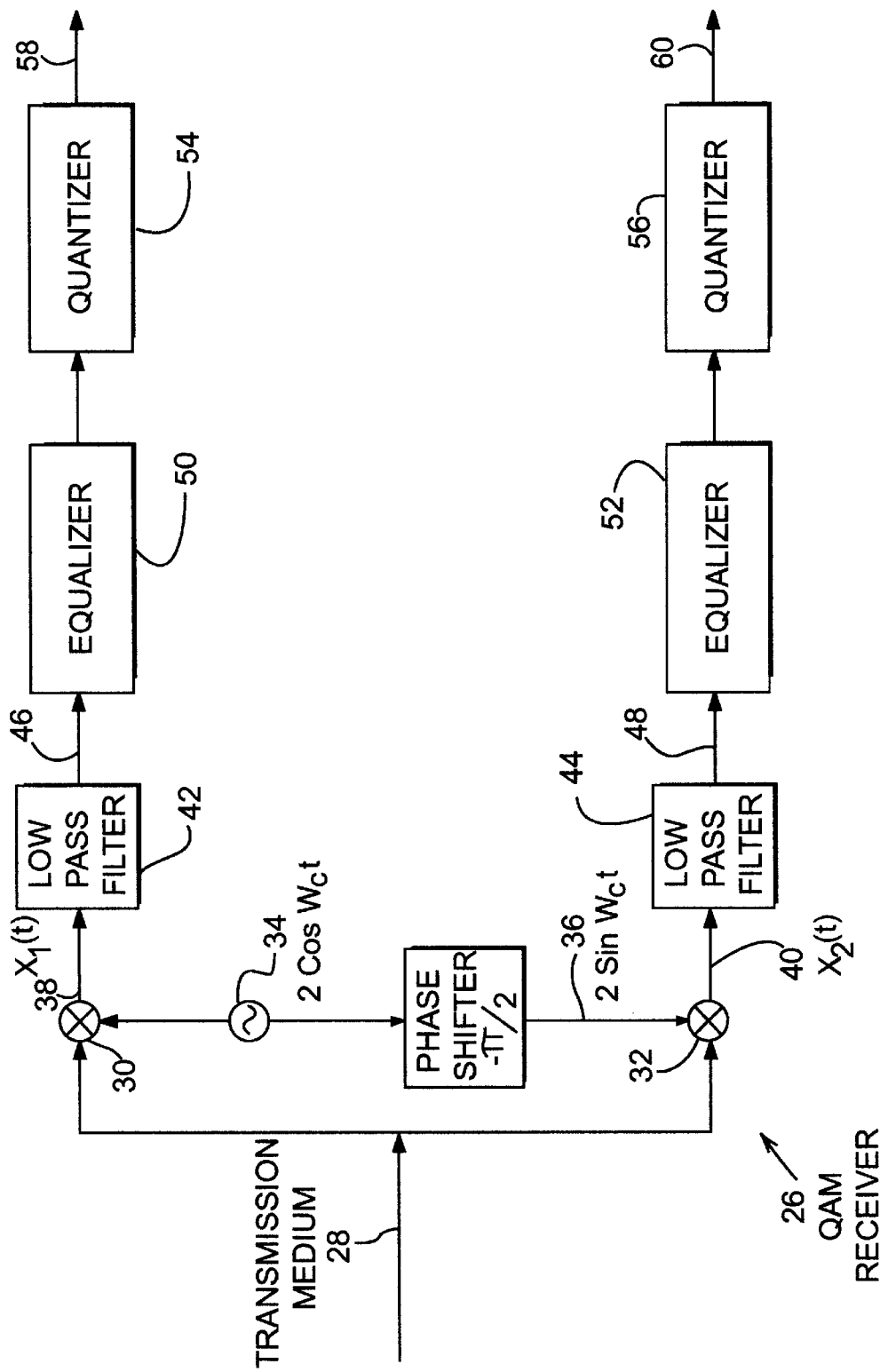
FIG. 3 is a schematic block diagram of a quadrature amplitude modulated receiver that utilizes the quantizer of the present invention.

FIG. 3 is a schematic block diagram of a typical quadrature amplitude modulation receiver 26. Receiver 26 is connected to the transmission medium 28 to receive input signals. The input signals are applied to demodulators 30 and 32 which apply a demodulator signal 34 equal to $2 \cos w_c t$ to demodulator 30, and a demodulator signal 36 equal to $2 \sin w_c t$ to demodulator 32. The demodulator signals are locked in phase with one another and the phase of the signal that was used to modulate the transmitted signal. The product of the demodulators 30 and 32 produces an output 38 equal to $x_1(t)$ and an output 40 equal to $x_2(t)$. Each of these signals, $x_1(t)$ and $x_2(t)$ contains frequency double components that are filtered out by low pass filters 42 and 44, respectively, so that the outputs 46, 48 are representative of the information used to modulate the carrier at the transmitter. Equalizers 50, 52 condition the analog signals 46 and 48, respectively. The equalizers 50, 52 provide filtering and correct for intersymbol interference and other factors. The output of the equalizers 50, 52 are applied to quantizers 54, 56 that generate quantized output signals 58, 60.

Figure 4:
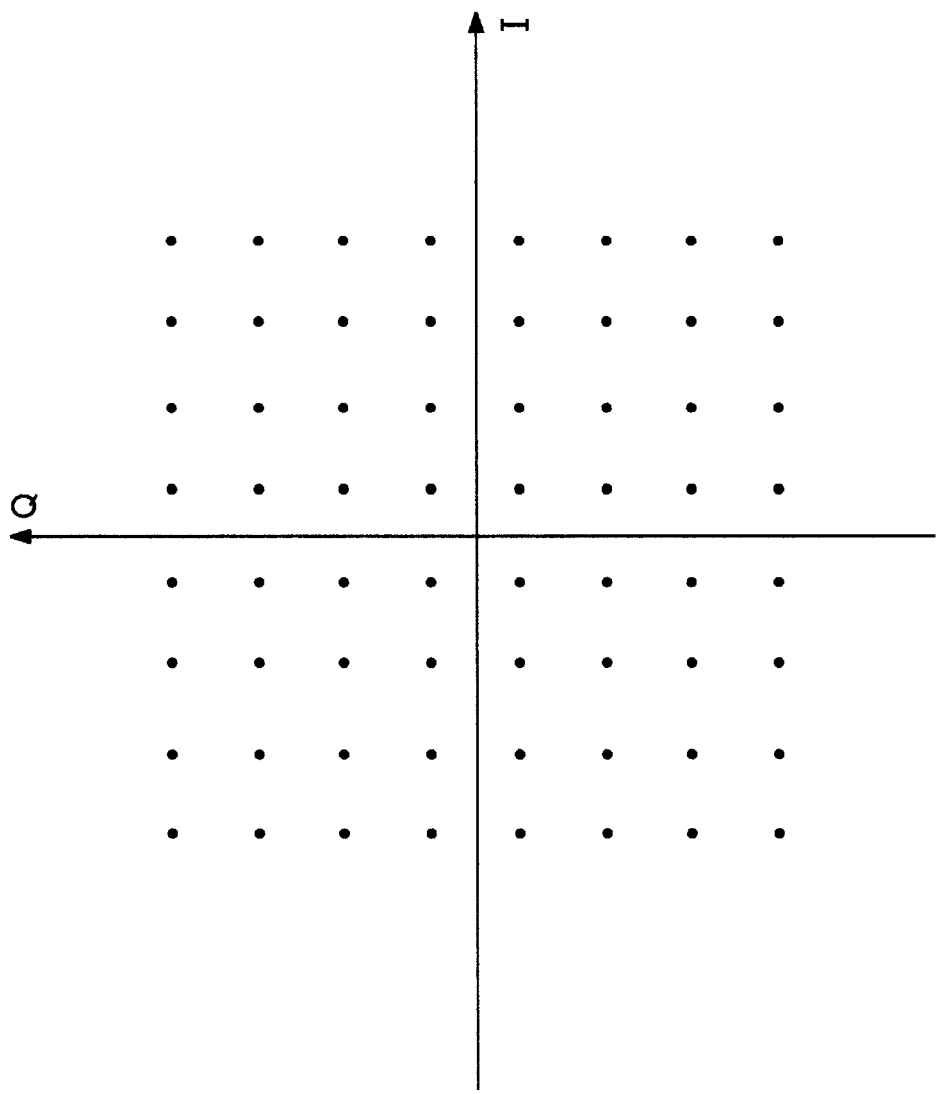
FIG. 4 is a phasor diagram of the constellation of points for a 64-QAM signal.

FIG. 4 is a phasor diagram of the constellation of points for the Q and I signals of a 64-QAM signal. The process of digitizing an analog signal involves the use of a quantizer to determine the correct level of the digital signal. For example, in a 64-QAM modulation scheme, 64 difference levels (i.e., 6 bits of data) are transmitted using two carrier signals, I and Q, that are both phase and amplitude modulated. In 64-QAM, a sine and cosine signal that are 90° out of phase are each amplitude-modulated by four amplitude levels and phase modulated by 180° to produce 16 different modulated signals in each phase quadrant. In this manner, 64 total points can be transmitted using 64-QAM. The present invention can be used with 64-QAM signals or any analog signal that is to be quantized.

Figure 5:
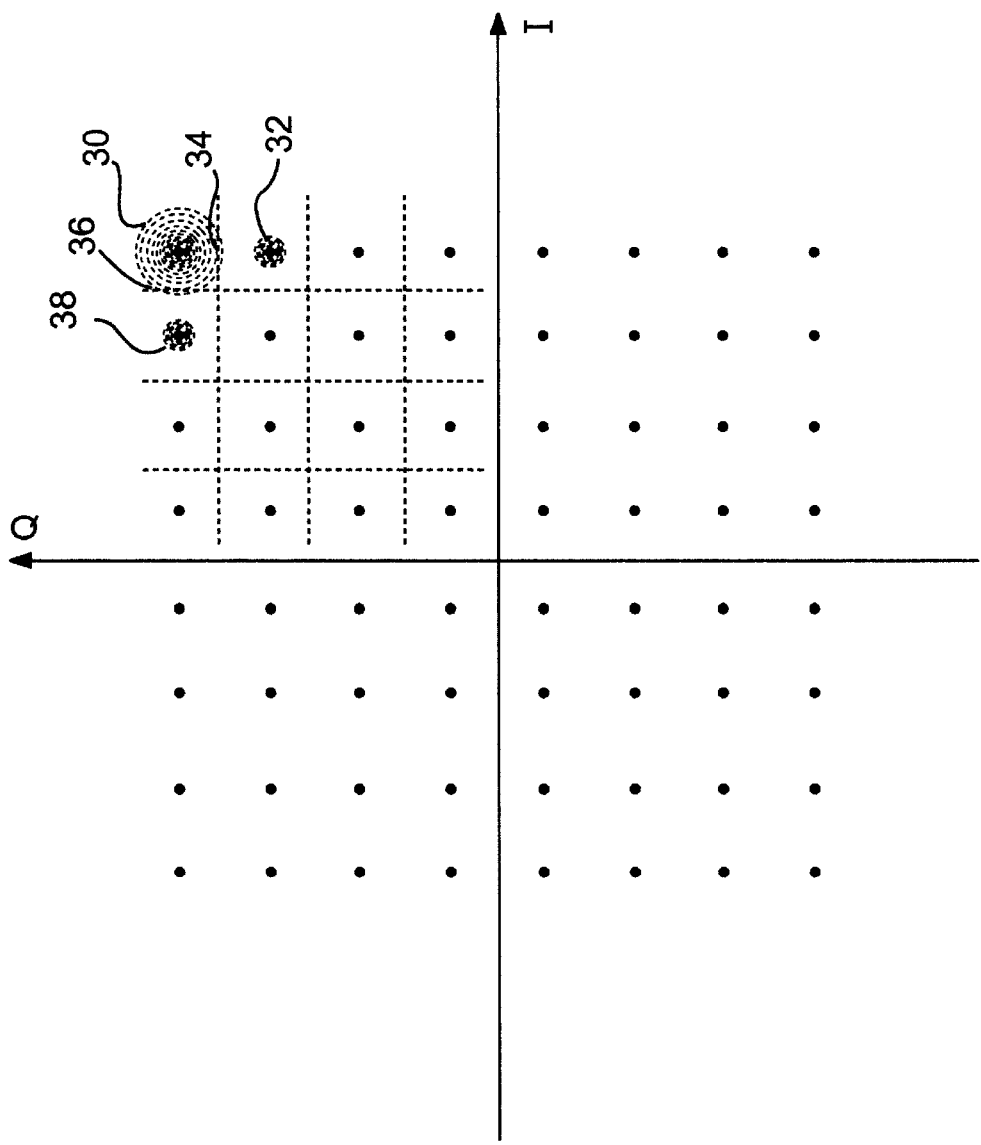
FIG. 5 is a phasor diagram similar to FIG. 3, illustrating noise and threshold decision levels.

FIG. 5 is another illustration of the constellation of points of a 64-QAM signal. As shown in FIG. 5, two of the points, 30 and 32, are illustratively shown as affected by noise. As illustrated in FIG. 5, the noise that affects points 30 and 32 may be both amplitude and phase dependent. As shown in FIG. 5, numerous signals are detected that do not coincide with the centroid of the transmitted signal, but rather fall in different phase and amplitude positions on the phasor diagram of FIG. 5. As can be seen from FIG. 5, the noise is greater for the higher amplitude signal 30 than it is for the lower amplitude signal 32. FIG. 5 also indicates a series of threshold decision levels, including threshold decision level 34 and threshold decision level 36.

As shown in FIG. 5, the decision threshold levels 34 and 36 are placed midway between the centroids of points 30 and 32. The noise that affects point 30 causes excursions of received signals beyond the decision thresholds 34 and 36. Consequently, errors occur which cause point 30 to be detected as point 32 or point 38. Movement of the decision thresholds 34 and 36 can prevent or reduce the errors in the process of quantizing the received signals.

Figure 6:
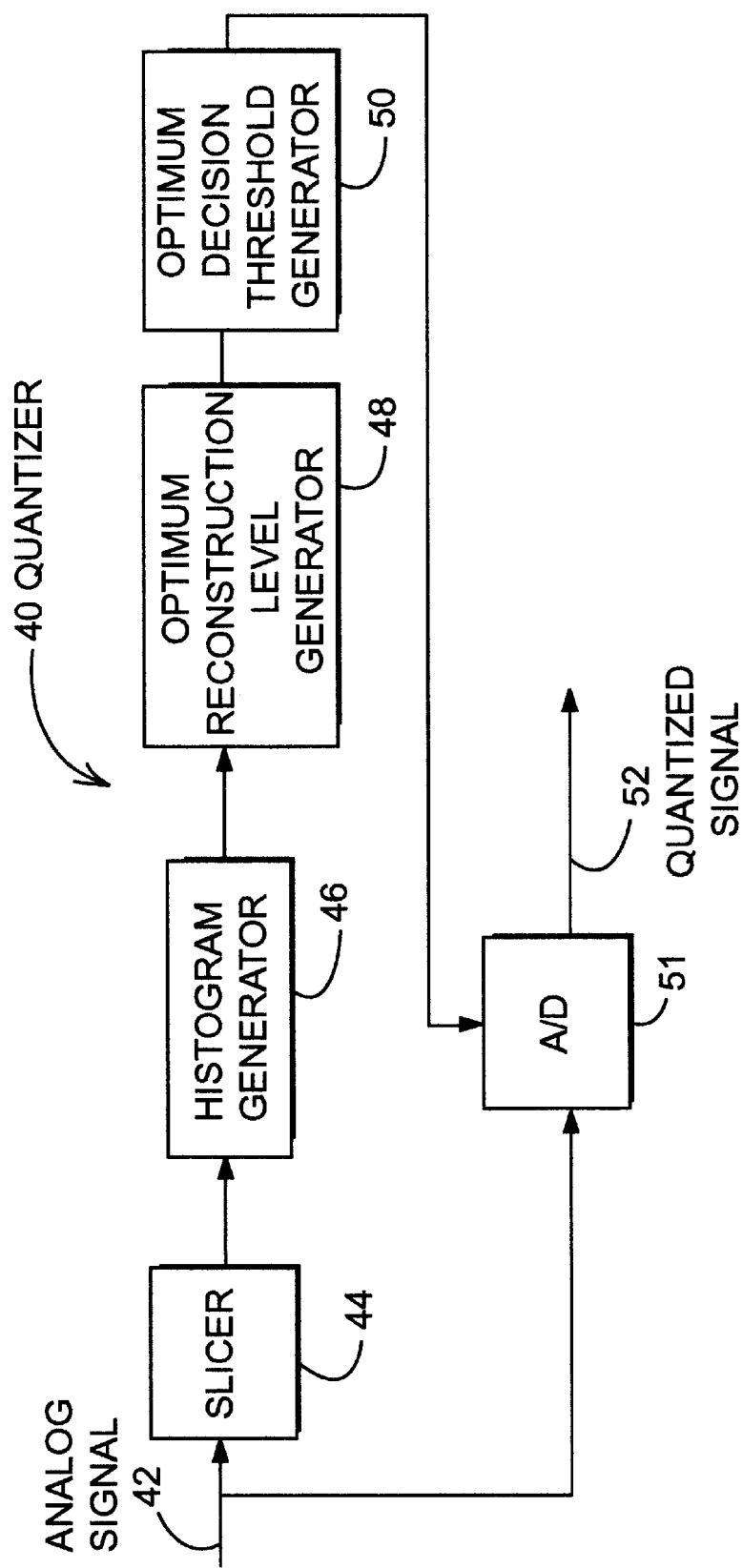
FIG. 6 is a schematic block diagram illustrating basic components of the present invention.

FIG. 6 is a schematic block diagram illustrating component portions of the quantizer 40 of the present invention. As shown in FIG. 6, an analog signal 42 is applied to a slicer 44 that slices the analog signal into a series of discrete digital signals having a high degree of resolution. Each of these digital signals may have a different amplitude and phase, such as the various noise affected signals of point 30 in FIG. 5. For example, each discrete level of the slicer 44 has an amplitude index that is representative of the amplitude of the analog signal 42 that is sampled at a particular time. This, of course, is performed for both the I and Q waveforms for QAM signals. This series of discrete signals from slicer 44 is then applied to a histogram generator 46 that generates histograms from the indices. The histogram is indicative of the number of discrete signals that are counted for each of the indices over a specified time period. The histogram information is then utilized by the optimum reconstruction level generator 48 that uses the histograms to determine a minimum mean squared error for each histogram to determine an optimum reconstruction level. Each of the optimum reconstruction levels that are determined by the optimum reconstruction level generator 48 are then used by the optimum decision threshold generator 50. Optimum decision threshold generator 50 determines the optimum decision thresholds by using the optimum reconstruction levels to determine an average of the optimum reconstruction levels. This average of the optimum reconstruction levels is then used as the optimum decision threshold by the analog to digital (A/D) converter 50. A/D converter 50 applies these optimum decision thresholds to analog signal 42 to generate the quantized signal 52.

Figure 7:
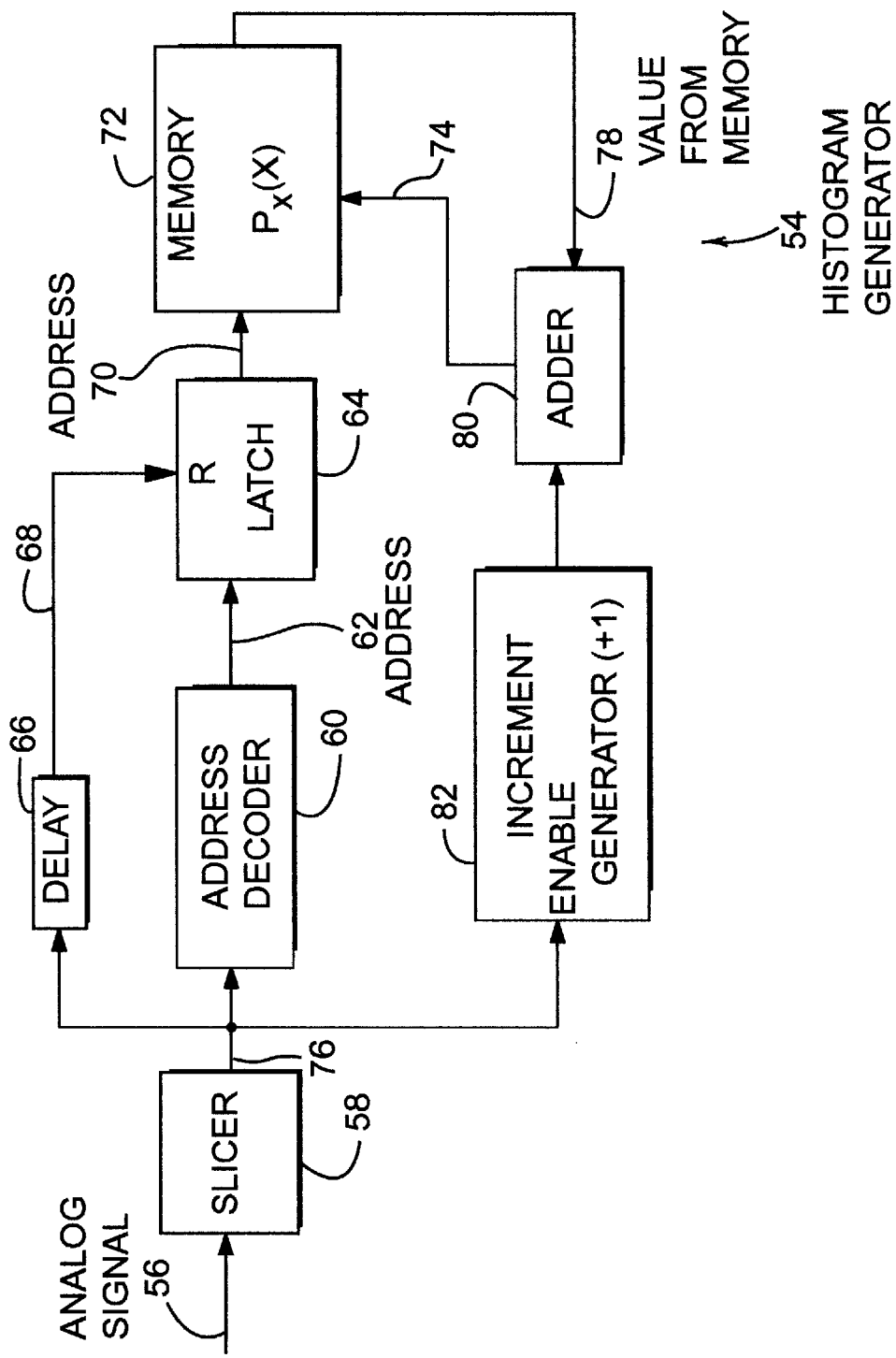
FIG. 7 is a schematic diagram of one implementation of a histogram generator.

FIG. 7 is a schematic block diagram of one example of a histogram generator 54. As shown in FIG. 7, an analog signal 56 is applied to a slicer 58 that is similar to slicer 44 of FIG. 6. Slicer 58 generates a series of discrete signals 76 having a series of indices that are representative of the amplitude of the analog signal 56 at discrete points in time. These amplitude indices are used by address decoder 60 to generate an address signal 62 corresponding to the detected amplitude that is held in latch 64. Each discrete signal is also applied to a delay circuit 66 which delays the signal for a period of one pulse and then generates an output 68 which resets the latch 64 to load the new address 62 from address decoder 60. The address signal 70, that is held by latch 64, addresses a memory location in memory 72. When the memory location in memory 72 is addressed by address signal 70, the value stored in memory at that address location is generated on output 78. This value is applied to adder 80. The index signal 76 is also applied to an increment generator 82 to enable the increment generator to generate a +1 signal that is added in adder 80 to the value that was read from the memory, to produce an accumulated value which is the value that was stored in memory that has been incremented by one. This accumulated value is indicative of the fact that another signal has been detected at a particular amplitude. This accumulated value 74 is then rewritten over the old value stored in memory at the address location indicated by address signal 70. In this manner, the memory 72 accumulates the number of discrete signals that have corresponding indices (amplitudes) to generate a histogram $P_x(x)$.

Figure 8:
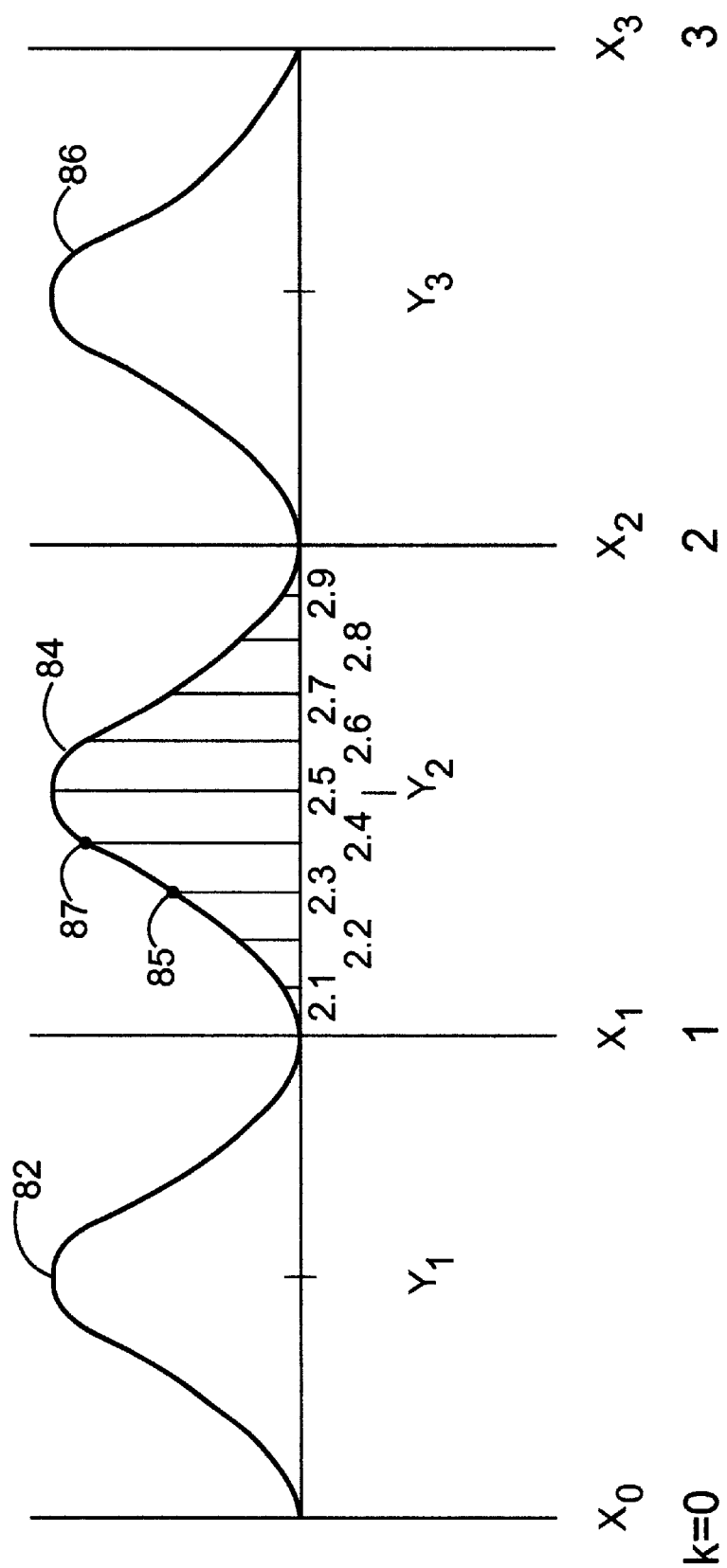
FIG. 8 is a graph of histograms that may be generated in accordance with the present invention.

FIG. 8 is a schematic illustration of one example of a series of histograms that may be generated in accordance with the present invention. As shown in FIG. 8, a series of optimum reconstruction levels, $y_1$, $y_2$, and $y_3$ are illustrated, which correspond to the centroid of the histograms 82, 84 and 86. Similarly, optimum threshold levels $x_1$ and $x_2$ are illustrated that correspond to the average of the adjacent optimum reconstruction levels $y_1$ and $y_2$, and $y_2$ and $y_3$ respectively. In a 64-QAM signal there are seven decision thresholds and eight reconstruction levels. The present invention uses a minimum means squared errors technique to determine the centroids $y_1$, $y_2$, and $y_3$ using a minimum means squared errors quantizer that is frequently referred to as a Max Quantizer or Lloyd-Max Quantizer. The Lloyd-Max Quantizer is disclosed in "Digital Coding of Waveforms, Principles and Applications to Speech and Video", by N. S. Jayant and Peter Noll, pp. 129–135, 1984, Prentice Hall International, Inc., London. The Lloyd-Max Quantizer determines the optimum reconstruction levels by using the following equation:

$$y_K = \frac{\int_{x_K}^{x_{K+1}} x P_x(x) dx}{\int_{x_K}^{x_{K+1}} P_x(x) dx}; \quad K = 1, 2, \ldots L \quad (1)$$

In this case, x constitutes the value of the index and $P_x(x)$ is the point distribution function or histogram that is illustrated in FIG. 8. K is an index that indicates the particular histogram being referred to, such as histogram 82, 84 or 88 as illustrated in FIG. 8. So, for example, to determine the optimum reconstruction level $y_2$ using equation (1), the integration indicated in equation (1) would occur across histogram 84. It should be noted, in addition, that the histograms 82, 84 and 86 illustrated in FIG. 8 are idealized histograms that are shown as continuous smooth histograms. In reality, the histograms of the present invention are stored discrete numbers that can alternatively be represented by way of a bar graph, rather than the idealized histograms illustrated in FIG. 8.

To determine the optimum decision threshold $x_K$ the following equation indicates that the optimum decision threshold is the average between the adjacent optimum reconstruction levels:

$$x_K = \frac{1}{2}(y_K + y_{K-1}); \quad K = 2, 3 \ldots L \quad (2)$$

Hence, the use of equations (1) and (2) can provide both the optimum reconstruction level $y_K$ and the optimum decision threshold level $x_K$.

As also shown in FIG. 8, a series of indices are indicated which range from a value of 2.1 to 2.9. Each of these indices corresponds to an address location that is indicated in equations (1) and (2) as x. As shown in FIG. 8, the values of the histogram $P_x(x)$ is indicated by the intersection of the histogram with the value at that address. For example, the value of $P_x(x)$ when x is equal to 2.3 is indicated by the vertical magnitude at reference numeral 85. Similarly, the value of $P_x(x)$ when x is equal to 2.4 is indicated by the vertical magnitude at reference numeral 87.

Figure 9:
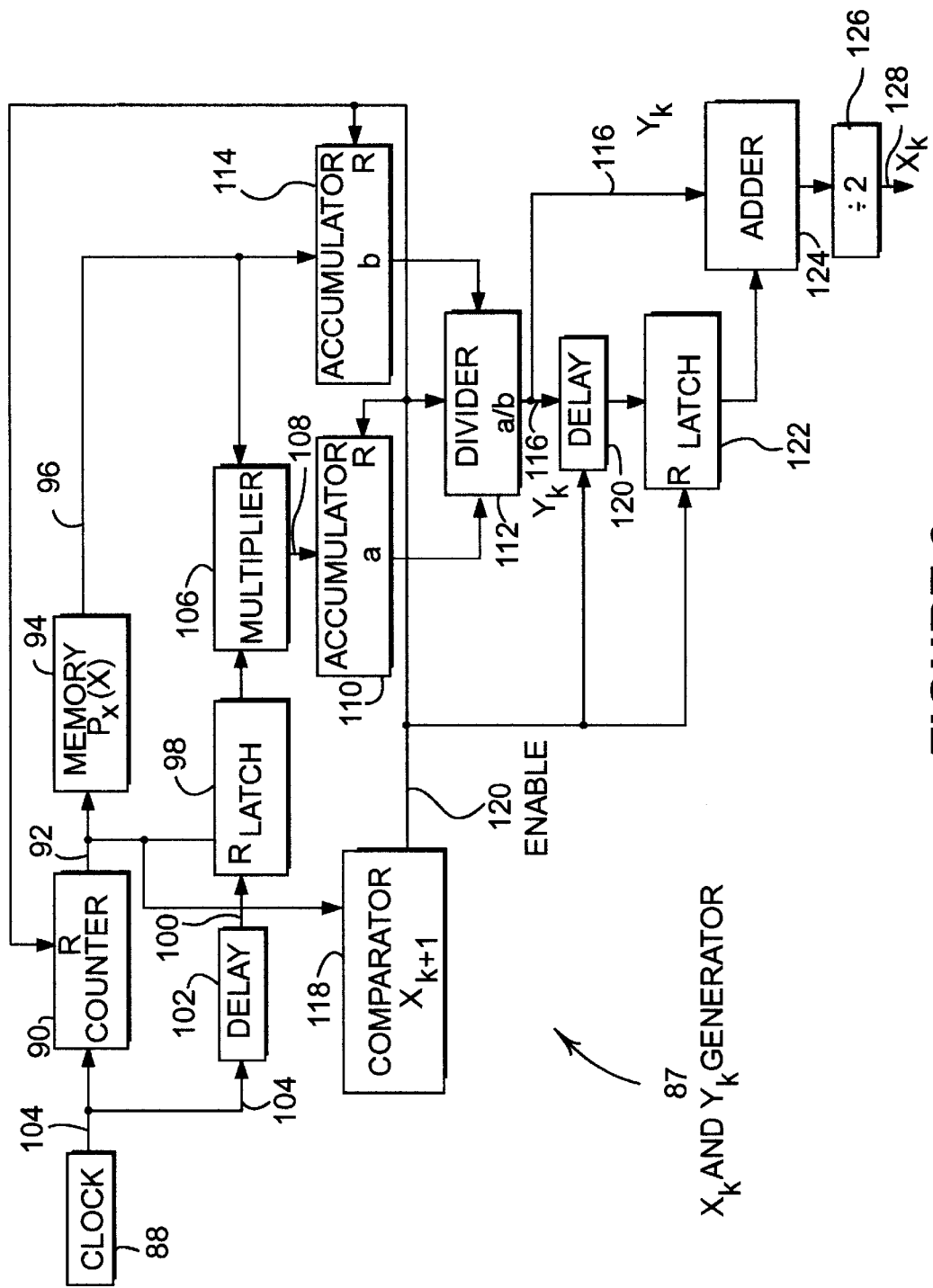
FIG. 9 is a schematic block diagram of a generator for generating $y_K$ and $x_K$.

FIG. 9 is a schematic block diagram of one example of a device for generating the optimum reconstruction level $y_K$ and the optimum decision threshold $x_K$. As shown in FIG. 9, a clock 88 generates a clock signal that is applied to a counter 90 that accumulates the clock pulses generated by clock 88. The counter signal 92, which constitutes the accumulated clock pulse signal, is applied to memory 94 that stores the histogram $P_x(x)$. This memory may correspond to the memory 72 of FIG. 7 in which the histogram is generated and stored. The counter output 92 therefore generates a sequential set of addresses that are applied to memory 94 to generate an output 96 that includes the values of the histogram $P_x(x)$ stored at each one of the sequential addresses of memory 94. The sequential set of addresses generated by the counter 90 are also applied to a latch 98 that stores each sequential address for one clock signal. Latch 98 is reset by reset signal 100 that is generated by a delay 102 that delays the clock signal 104 by one clock cycle. Each sequential address signal corresponds to x in equation (1) which is applied to multiplier 106. The value that is stored in memory 94 at each address location is also applied to multiplier 106 so that the value of $P_x(x)$ at a particular address location x is multiplied by x to produce a series of first results 108. The series of first results 108 are accumulated in accumulator 110 and applied to divider 112. The output 96 of memory 94, which corresponds to the value of the histogram at each one of the sequential address locations for x, is accumulated in accumulator 114. This accumulated value is also applied to divider 112 which divides the accumulated value from accumulator 110 by the accumulated value for accumulator 114. The accumulated value for accumulator 110 corresponds to the integrated value of the numerator of equation (1). The accumulated value of accumulator 114 corresponds to the integrated value of the denominator of equation (1). The output 116 of divider 112 therefore corresponds to the optimum reconstruction level $y_K$.

As also illustrated in FIG. 9, a comparator 118 compares the sequential address signal 92 with the value of $x_{K+1}$. When the address signal 92 is equal to $x_{K+1}$, an enable signal 120 is generated that resets accumulator 110, accumulator 114, and counter 90. Enable signal 120 is also used to enable divider 112 to generate the output 116 which corresponds to the optimum reconstruction level $y_K$. The output 116 is applied to delay device 120 which delays the output 116 by the period of the enable signal 120. The output of the delay 120 is applied to latch 122 which latches the output from delay 120 and applies the delayed output to adder 124. Adder 124 adds the output $y_K$ with a delayed output of the previous division that corresponds to $y_{K-1}$. The output of the adder 124 is then applied to a divide by two circuit 126 to produce an output 128 that corresponds to the optimum decision threshold $x_K$.

Figure 10:
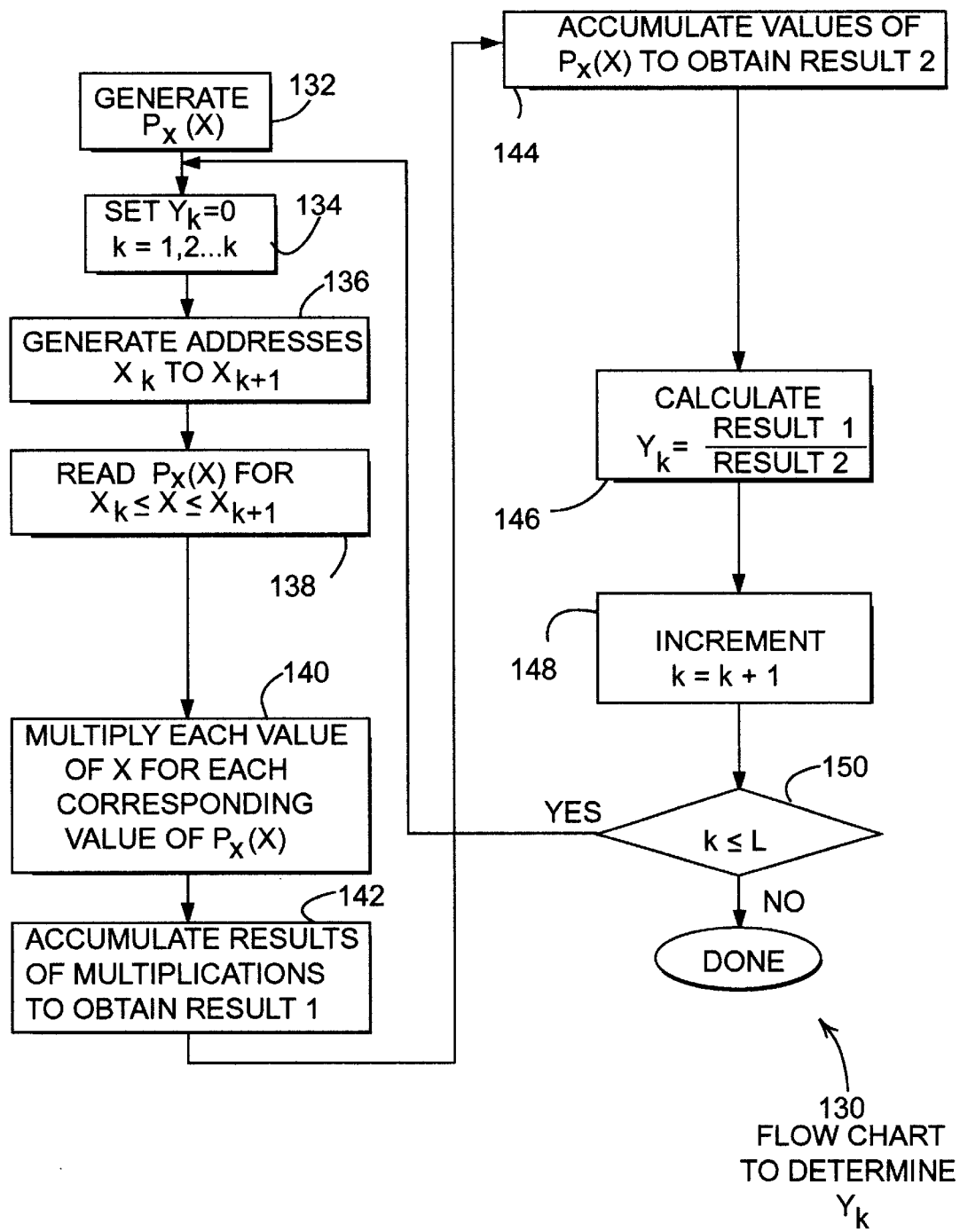
FIG. 10 is a flow chart illustrating the manner of generating $y_K$.

FIG. 10 is a flow chart 130 for determining $y_K$. At step 132 the histogram $P_x(x)$ is generated. This step is disclosed in more detail in FIG. 12. At step 134, $y_K$ is set at zero. At step 136, addresses are generated for x from $x_K$ to $x_{K+1}$. At step 138, each of these addresses is used to read the value of the histogram $P_x(x)$ for address values of x between $x_K$ and $x_{K+1}$. At step 140 each value of x is multiplied by each corresponding value of $P_x(x)$. At step 142, each of the results of the multiplications are accumulated to obtain result number 1. At step 144, each of the values of $P_x(x)$ that were read at step 138 are accumulated to obtain result number 2. At step 146, $y_K$ is calculated by dividing result number 1 by result number 2. At step 148, the value of K is incremented by 1. At decision block 150 the value of K is compared with the value of L. If the value of K is greater than L the process is done. If the value of K is less than or equal to L the process is continued at step 134.

Figure 11:
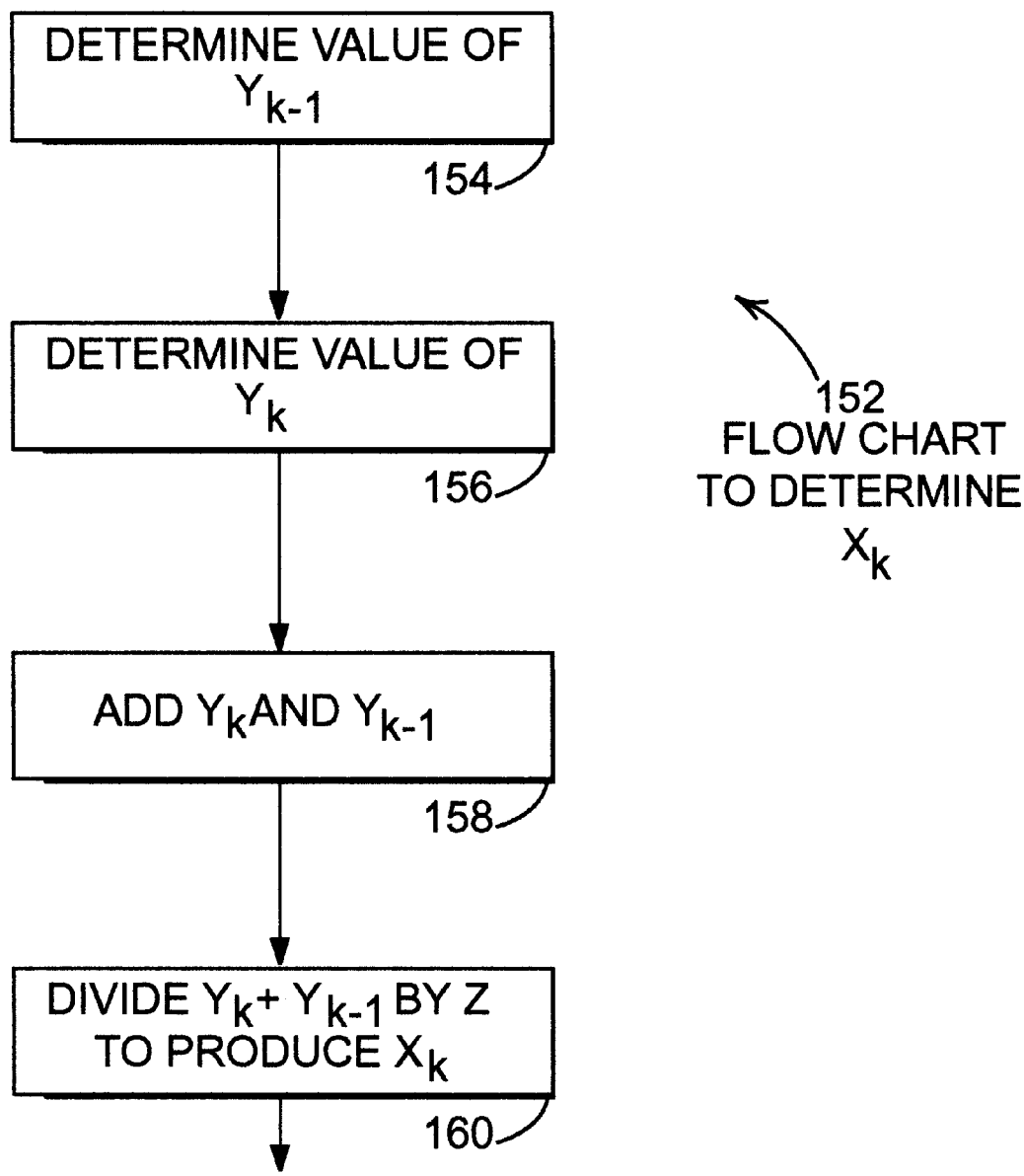
FIG. 11 is a flow chart illustrating the manner of generating $x_K$.

FIG. 11 is a flow chart 152 for determining $x_K$. At step 154, the value of $y_{K-1}$ is determined. At step 156, the value of $y_K$ is determined. At step 158, the value of $y_K$ and the value of $y_{K-1}$ are added together. At step 160, the values of $y_K$ and $y_{K-1}$ divided to produce $x_K$.

Figure 12:
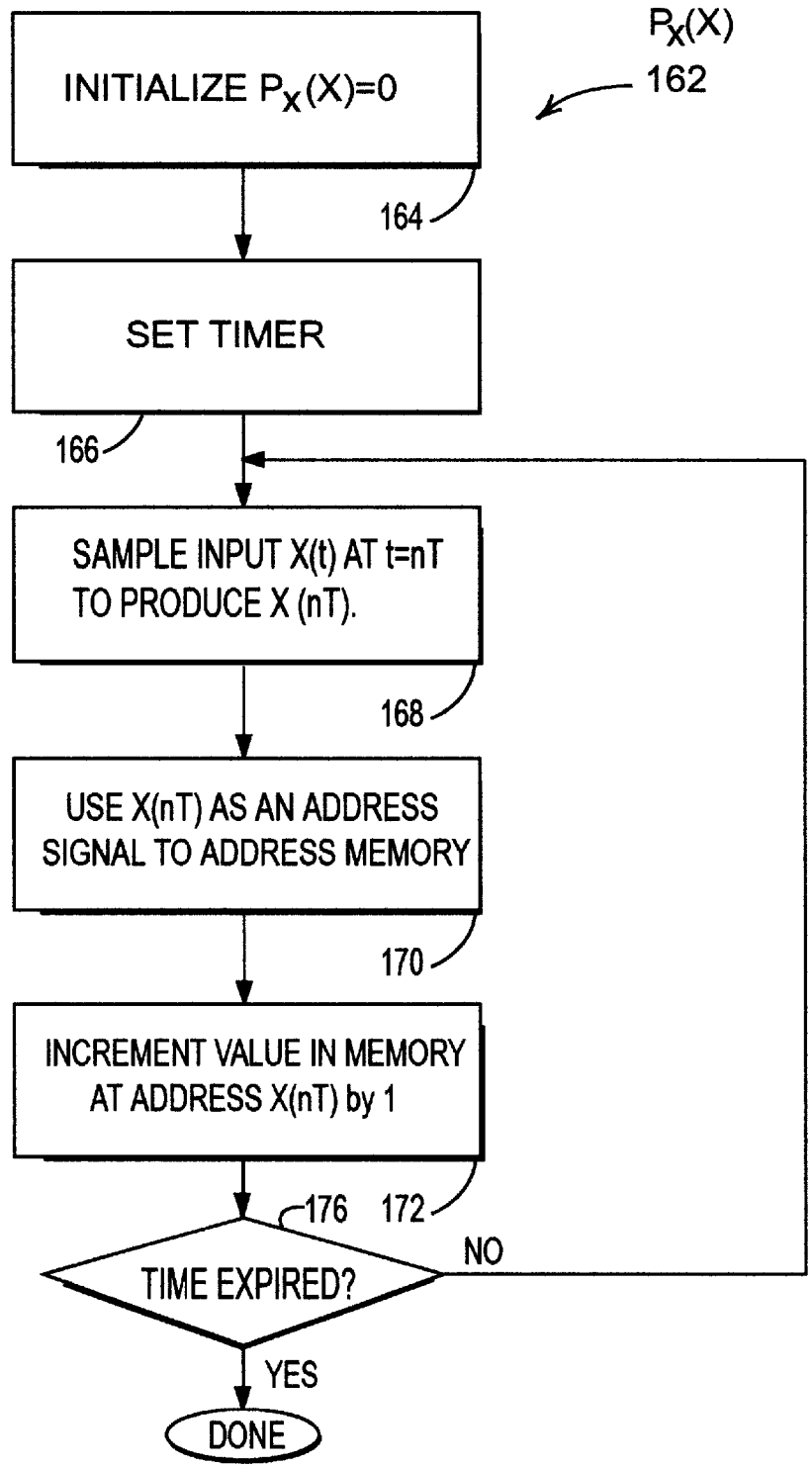
FIG. 12 is a flow chart illustrating the manner of generating a histogram.

FIG. 12 is a flow chart 162 for generating the histogram $P_x(x)$. At step 164, the system is initialized to set $P_x(x)$ at zero. At step 166, a timer is set for a predetermined period (e.g. one second) to sample an analog input signal to obtain data for generating the histogram $P_x(x)$. At step 168, the input signal x(t) is sampled at a series of equally spaced time periods t=nT, to produce a signal x(nT) which is the value of x at (nT). At step 170, x(nT) is used as an address signal to address a memory location of memory 72 of FIG. 7. At step 172, the value stored at address x(nT) is incremented by a value of one. At decision block 176, it is determined whether the time set on the timer has expired. If it has, the process is done. If the time on the timer has not expired, the process is continued at step 168.

The present invention therefore provides a unique method and apparatus for providing an adaptive system for determining an optimum decision threshold in the presence of nonlinear distortion and/or noise. The present invention adaptively allows a way of computing where the decision threshold can be placed to minimize the overall error rate by observing signal strengths of a received signal. The present invention is capable of minimizing the error rate independently of whether noise or other distortions nonproportionately affect the different states of the signals. In addition, the present invention is capable of providing symmetric decision thresholds if the noise is symmetric. In that way, system performance is not degraded. Error rates for detection of quantized signals can be significantly reduced using the present invention so that significantly improved signals can be obtained. The present invention utilizes the concept of the Lloyd-Max Quantizer which has previously been used to provide an optimum method of determining the manner in which an analog signal can be quantized to allow a better reconstruction of that signal. The present invention utilizes this methodology in a unique and novel way on a demodulated signal to determine decision thresholds to retrieve a quantized signal from an input analog signal.

The foregoing description of the invention has been presented for purposes of illustration and description. It is not intended to be exhaustive or to limit the invention to the precise form disclosed, and other modifications may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A quantizer that adaptively determines a value of an optimum threshold for quantizing an analog signal to minimize the overall quantizing error rate by observing amplitude levels of said analog signal comprising:

a histogram generator that generates a histogram, said histogram comprising a plurality of histogram values representing said amplitude levels over a predetermined time period;

an optimum reconstruction level generator that uses said histogram values to generate optimum reconstruction levels by determining mean squared errors; and an optimum decision threshold generator that uses said optimum reconstruction levels to generated optimum decision thresholds by determining the average of said optimum reconstruction levels.

2. The quantizer of claim 1 wherein said histogram generator comprises:

a slicer that generates signals having amplitude values representative of said amplitude levels of said analog signal at discrete times over said predetermined time period;

a memory that stores histogram values, each of said histogram values representing the number of occurrences of each amplitude value of said signals generated by said slicer over said predetermined time to produce said histograms.

3. The quantizer of claim 2 wherein said optimum reconstruction level generator comprises:

a multiplier that multiplies each of said histograms by each of a series of said amplitude values of said amplitude levels for each said histogram to produce a series of first results;

a first accumulator that accumulates said first results to produce first accumulated result;

a second accumulator that accumulates said number of accumulated occurrences of each value of said signal strengths for each histogram to produce a second accumulated result; and a divider that divides said first accumulated result by said second accumulated result for each histogram to produce an optimum reconstruction level signal.

4. The quantizer of claim 1 wherein said optimum reconstruction level generator comprises:

a multiplier that multiplies each of said histogram values of said histogram by index levels of said histogram to produce a series of first results;

a first accumulator that accumulates said series of first results to produce a first accumulated result;

a second accumulator that accumulates said histogram values to produce a second accumulated result; and, a divider that divides said first accumulated result by said second accumulated result to produce an optimum reconstruction level signal.

5. The quantizer of claim 1 wherein said optimum decision threshold generator comprises:

an adder that adds adjacent optimum reconstruction levels to produce an added adjacent optimum reconstruction level value;

a divider that divides said added adjacent optimum reconstruction level values by two to determine an average of said adjacent optimum reconstruction levels.

6. A method of quantizing an analog signal using an optimum decision threshold comprising the steps of:

slicing said analog signal into a series of discrete signals having indices that are representative of the amplitude of said analog signal;

generating a histogram from said indices indicative of the number of discrete signals for each of said indices;

generating optimum reconstruction levels by using said histogram to determine minimum mean squared errors; and generating said optimum decision thresholds by using said optimum reconstruction levels to determine the average of said optimum reconstruction levels.

7. The method of claim 6 wherein said step of generating said histogram comprises:

accumulating a series of histogram values indicative of the number of said discrete signals having the same index;

storing said series of histogram values to form a histogram.

8. The method of claim 6 wherein said step of generating optimum reconstruction levels comprising the steps of:

multiplying each of said series of histogram values by its corresponding index to produce a series of first results;

accumulating said series of first results to produce a first accumulated result;

accumulating said series of histogram values to produce a second accumulated result; and dividing said first accumulated result by said second accumulated result to produce an optimum reconstruction level.

9. The method of claim 6 wherein said step of generating said optimum decision thresholds comprises the steps of:

adding adjacent optimum reconstruction levels to produce an added adjacent optimum reconstruction level value; and dividing said added adjacent optimum reconstruction level values by two to determine an average of said adjacent optimum reconstruction levels to produce said optimum decision threshold.

10. A quantizer for quantizing an analog signal using an optimum decision threshold comprising:

means for slicing an analog signal into a series of discrete signals having indices that are representative of the amplitude of said series of discrete signals;

means for generating a histogram from said indices;

means for generating optimum reconstruction levels by using said histogram to determine minimum mean squared errors; and means for generating optimum decision thresholds by using said optimum reconstruction levels to determine an average of said optimum reconstruction levels.

* * * * *